US012761362B2

(12) United States Patent
Singh

(10) Patent No.: US 12,761,362 B2
(45) Date of Patent: Oct. 13, 2026

(54) AUTONOMOUS RECONFIGURABLE INTELLIGENT SURFACES

(71) Applicant: Dell Products L.P., Round Rock, TX (US)

(72) Inventor: Tejinder Singh, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 746 days.

(21) Appl. No.: 18/194,693

(22) Filed: Apr. 3, 2023

(65) Prior Publication Data

US 2024/0329253 A1 Oct. 3, 2024

(51) Int. Cl.

| | |
|---|---|
| ***G01S 17/894*** | (2020.01) |
| ***G01S 17/32*** | (2020.01) |
| ***H04B 7/04*** | (2017.01) |

(52) U.S. Cl.

CPC ............ *G01S 17/894* (2020.01); *G01S 17/32* (2013.01); *H04B 7/04013* (2023.05)

(58) Field of Classification Search

CPC .... G01S 17/894; G01S 17/32; H04B 7/04013

See application file for complete search history.

(56) References Cited

U.S. PATENT DOCUMENTS

| | | | | |
|---|---|---|---|---|
| 8,900,930 | B2 | 12/2014 | Moon | |
| 9,923,267 | B1 | 3/2018 | Pala et al. | |
| 9,972,905 | B2 | 5/2018 | Schaffner et al. | |
| 11,133,588 | B1 | 9/2021 | Matos et al. | |
| 12,126,094 | B2 | 10/2024 | Gharbieh et al. | |
| 2016/0071653 | A1 | 3/2016 | Lamorey | |
| 2016/0345209 | A1* | 11/2016 | Talukdar | H04W 76/15 |
| 2017/0263179 | A1 | 9/2017 | Aurongzeb et al. | |
| 2018/0053603 | A1 | 2/2018 | Al-hazmi et al. | |

(Continued)

FOREIGN PATENT DOCUMENTS

| | | |
|---|---|---|
| EP | 4 175 068 | 5/2023 |

OTHER PUBLICATIONS

Non-Final Office Action received for U.S. Appl. No. 18/194,685 dated Apr. 2, 2025, 14 pages.

(Continued)

*Primary Examiner* — Jonathan Malikasim

(74) *Attorney, Agent, or Firm* — Amin, Turocy & Watson, LLP

(57) ABSTRACT

The technology described herein is directed towards an autonomous reconfigurable intelligent surface (of a node) that is capable of detecting the node's surrounding environment and adjusting the redirection of impinging electromagnetic beams based on the detected environment. Real-time control of the reconfigurable intelligent surface is achieved from within the node itself, while the node consumes relatively little power. A LiDAR-based or other sensor coupled to the node provides a three-dimensional map of the environment's current state. Within the node, an AI module works with a controller to determine the phase of each reconfigurable unit-cell that forms the reconfigurable intelligent surface. The phase response of each cell redirects the impinging electromagnetic wave in the desired direction, e.g., to avoid an obstacle. This can significantly reduce coverage problems in the millimeter-wave band and even higher frequencies for beyond 5G and 6G applications.

20 Claims, 11 Drawing Sheets

(56) References Cited

U.S. PATENT DOCUMENTS

| | | | | |
|---|---|---|---|---|
| 2018/0166220 | A1 | 6/2018 | Lazarus et al. | |
| 2020/0068044 | A1* | 2/2020 | Shimizu | H04W 4/46 |
| 2022/0400462 | A1* | 12/2022 | Dai | G01S 11/04 |
| 2023/0083308 | A1 | 3/2023 | Cohen et al. | |
| 2023/0093364 | A1* | 3/2023 | Kumari | H04B 7/0617 342/58 |
| 2023/0144085 | A1* | 5/2023 | Dutta | G01S 3/14 342/350 |
| 2023/0210026 | A1 | 6/2023 | Philip et al. | |
| 2023/0216175 | A1 | 7/2023 | Masuda | |
| 2024/0032445 | A1 | 1/2024 | Solomko et al. | |
| 2024/0063986 | A1* | 2/2024 | Hwang | H04L 5/0094 |
| 2024/0080074 | A1* | 3/2024 | Lee | G01S 7/006 |
| 2024/0331950 | A1 | 10/2024 | Singh | |
| 2024/0331951 | A1 | 10/2024 | Singh | |
| 2024/0332794 | A1 | 10/2024 | Singh | |
| 2024/0389483 | A1 | 11/2024 | Ting et al. | |
| 2024/0413858 | A1* | 12/2024 | Mcmenamy | H04W 24/10 |
| 2025/0048126 | A1* | 2/2025 | Echigo | H04B 7/088 |

OTHER PUBLICATIONS

Ex Parte Quayle Action received for U.S. Appl. No. 18/194,711 dated Apr. 2, 2025, 9 pages.

Notice of Allowance received for U.S. Appl. No. 18/194,711 dated Jun. 17, 2025, 5 pages.

Nokia Bell Labs, "Communications in the 6G Era", Url-https://www.bell-labs.com/institute/whitepapers/communications-6g-era-white-paper/#gref (download link: https://onestore.nokia.com/asset/207766), Sep. 9, 2020, 19 pages.

Kitayama et al., "Research of Transparent RIS Technology Towards 5G Evolution & 6G", NTT DOCOMO Technical Journal, vol. 23, No. 2, Oct. 2021, 10 pages.

Strinati et al., "Wireless Environment as a Service Enabled by Reconfigurable Intelligent Surfaces: The RISE-6G Perspective", Apr. 13, 2021, 6 pages.

Singh et al., "Chalcogenide Phase-Change Material Germanium Telluride for Radio-Frequency Applications", IEEE Nanotechnology Magazine, Jun. 2022, 20 pages.

Singh et al., "Experimental Investigation of Performance, Reliability, and Cycle Endurance of Nonvolatile DC-67 GHz Phase-Change RF Switches", IEEE Transactions on Microwave Theory and Techniques, vol. 69, No. 11, Nov. 2021, 14 pages.

Wikstrom et al., "6G-Connecting a Cyber-physical World", Ericsson White Paper, Feb. 2022, 31 pages.

Basar et al., "Wireless Communications Through Reconfigurable Intelligent Surfaces" IEEE, Jul. 19, 2019, 20 pages.

Subrt et al., "Controlling Propagation Environments Using Intelligent Walls," Proceedings of the 6th European Conference on Antennas and Propagation (EUCAP), Mar. 26-30, 2012, 30 pages.

Huang et al., "Reconfigurable Metasurface for Multifunctional Control of Electromagnetic Waves", Advanced Optical Materials, 2017, 7 pages.

Debogovic et al., "Low Loss MEMS-Reconfigurable 1-Bit Reflectarray Cell with Dual-Linear Polarization", IEEE Transactions on Antennas and Propagation, vol. 62, No. 10, Oct. 2014, 6 pages.

Zendejas et al. "Magnetic MEMS Reconfigurable Frequencyelective Surfaces", Journal of Microelectromechanical Systems, vol. 15, No. 3, Jun. 2006, 11 pages.

Singh et al., "Miniaturized 6-Bit Phase-Change Capacitor Bank with Improved Self-Resonance Frequency and Q", Proceedings of the 52nd European Microwave Conference, Sep. 27-29, 2022, 4 pages.

Singh et al., "Chalcogenide GeTe-Based Non-Volatile Switched K-Band Tunable Reflective Load for Reconfigurable RF Circuits", IEEE/MTT-S International Microwave Symposium, 2022, 4 pages.

Singh et al., "Reconfigurable and Scalable Monolithic Band Reject Circuit Utilizing Phase-Change Switch Matrices", Proceedings of the 16th European Microwave Integrated Circuits Conference, Apr. 3-4, 2022, 4 pages.

Singh et al., "Scalable Non-Volatile Chalcogenide Phase Change GeTe-Based Monolithically Integrated mmWave Crossbar Switch Matrix", IEEE/MTT-S International Microwave Symposium, 2021, 4 pages.

Singh, et al., "Reconfigurable PCM GeTe-Based Latching 6-Bit Digital Switched Capacitor Bank", Proceedings of the 15th European Microwave Integrated Circuits Conference, Jan. 11-12, 2021, 4 pages.

Singh et al., "Miniaturized Reconfigurable 28 GHz PCM-Based 4-bit Latching Variable Attenuator for 5G mmWave Applications", IEEE/MTT-S International Microwave Symposium, 2020, 4 pages.

Singh et al., "A Miniaturized Monolithic PCM Based Scalable Four-Port RF Switch Unit-Cell", Proceedings of the 49th European Microwave Conference, Oct. 1-3, 2019, 4 pages.

Singh, et al., "Monolithic PCM Based Miniaturized T-type RF Switch for Millimeter Wave Redundancy Switch Matrix Applications", IEEE/MTT-S International Microwave Symposium, 2019, 3 pages.

Singh, et al., "Characterization of Phase Change Material Germanium Telluride for RF Switches", Proceedings of the 48th European Microwave Conference, Sep. 25-27, 2018, 4 pages.

Singh, et al., "Chalcogenide Phase Change Material GeTe Based Inline RF SPST Series and Shunt Switches", IEEE MTT-S International Microwave Workshop Series on Advanced Materials and Processes for RF and THz Applications, Jul. 16-18, 2018, 3 pages.

Singh et al., "Compact 26-30 GHz Reflection-Type Phase Shifter With 8-Bit Switched Phase Tuning Utilizing Chalcogenide Phase-Change Switches", IEEE Transactions on Microwave Theory and Techniques, vol. 71, No. 1, Jan. 2023, 10 pages.

Singh et al., "Ultra-Compact Phase-Change GeTe-Based Scalable mmWave Latching Crossbar Switch Matrices", IEEE Transactions on Microwave Theory and Techniques, vol. 70, No. 1, Jan. 2022, 12 pages.

Singh et al., "Experimental Investigation of Thermal Actuation Crosstalk in Phase-Change RF Switches Using Transient Thermoreflectance Imaging", IEEE Transactions on Electron Devices vol. 68, No. 7, Jul. 7, 2021.

Singh et al., "Non-Volatile Multiport DC-30 GHz Monolithically Integrated Phase-Change Transfer Switches", IEEE Electron Device Letters, vol. 42, No. 6, Jun. 2021, 4 pages.

Singh et al., "Scalable mmWave Non-Volatile Phase Change GeTe-Based Compact Monolithically Integrated Wideband Digital Switched Attenuator", IEEE Transactions on Electron Devices, vol. 68, No. 5, May 1, 2021, 7 pages.

Singh et al., "Investigation Into Self Actuation Limitation and Current Carrying Capacity of Chalcogenide Phase Change GeTe-Based RF Switches", IEEE Transactions on Electron Devices, vol. 67, No. 12, Dec. 1, 2020, 6 pages.

Singh et al., "Loss Compensated PCM GeTe-Based Latching Wideband 3-bit Switched True-Time-Delay Phase Shifters for mmWave Phased Arrays", IEEE Transactions on Microwave Theory and Techniques, vol. 38, No. 9, Sep. 2020, 11 pages.

Singh et al., "Miniaturized DC-60 GHz RF PCM GeTe-Based Monolithically Integrated Redundancy Switch Matrix Using T-Type Switching Unit Cells", IEEE Transactions on Microwave Theory and Techniques, vol. 37, No. 12, Dec. 2019, 10 pages.

Singh et al., "Characterization, Optimization, and Fabrication of Phase Change Material Germanium Telluride Based Miniaturized DC-67 GHz RF Switches", IEEE Transactions on Microwave Theory and Techniques, vol. 67, No. 8, Aug. 2019, 14 pages.

Yang et al., "A Programmable Metasurface with Dynamic Polarization, Scattering and Focusing Control", Scientific Reports, vol. 6, No. 35692, Oct. 24, 2016, 1-11pages.

Kaina et al., "Shaping Complex Microwave Fields In Reverberating Media With Binary Tunable Metasurfaces", Scientific Reports, vol. 4, No. 6693, Oct. 21, 2014, 8 pages.

Dai et al., "Reconfigurable Intelligent Surface-Based Wireless Communications: Antenna Design, Prototyping, and Experimental Results", IEEE Access, vol. 8, Mar. 2, 2020, 11 pages.

Macom "GaAs Beamlead PIN Diode", Url-https://cdn.macom.com/datasheets/MA4GP905.pdf, Retrieved from the Internet: Mar. 2, 2023, 4 pages.

(56) References Cited

OTHER PUBLICATIONS

Zhuang, et al., "Future Internet Bandwidth Trends: An Investigation on Current and Future Disruptive Technologies", Secure Systems Lab, Dept. Comput. Sci. Eng., Polytech. Inst. New York Univ., New York, NY, USA, Tech. Rep. TR-CSE-2013-04, Nov. 1, 2013.
Poulakis, "Metamaterials Could Solve One of 6G's Big Problems [Industry View]," in Proceedings of the IEEE, vol. 110, No. 9, pp. 1151-1158, Sep. 3, 2022, DOI: 10.1109/JPROC.2022.3196696.
Subrt, et al., "Controlling Propagation Environments Using Intelligent Walls," in 2012 6th European Conference on Antennas and Propagation (EUCAP), doi:10.1109/eucap.2012.6206517. 2012.
Kaina, et al., "Shaping complex microwave fields in reverberating media with binary tunable metasurfaces," ScientificReports, vol. 4, pp. 1-7, Published Oct. 21, 2014, DOI: 10.1038/srep06693.
Dai, et al., "Reconfigurable Intelligent Surface-Based Wireless Communications: Antenna Design, Prototyping, and Experimental Results," in IEEE Access, vol. 8, pp. 45913-45923, date of publication Mar. 2, 2020, DOI: 10.1109/ACCESS.2020.2977772.
International Search Report and Written Opinion for PCT Application No. PCT/US2024/013896 mailed Sep. 5, 2024, 18 pages.
Rodrigues Davi V Q et al: "Optimized phase shifts in intelligent reflective surfaces for robust radar-based indoor coverage enhancement" Radar Sensor Technology XXVII, Proc. of SPIE, vol. 12535, Jun. 14, 2023, 13 pages.
Molero Carlos et al: "Metamaterial-Based Reconfigurable Intelligent Surface: 3D Meta-Atoms Controlled by Graphene Structures" IEEE Communications Magazine, IEEE Service Center, Piscataway, US, vol. 59, No. 6, Jul. 5, 2021 {Jul. 5, 2021) , pp. 42-48.
Singh et al. "Reconfigurable Intelligent Surfaces Using Latching Rotational Patterns of Chalcogenide Elements" U.S. Appl. No. 18/512,304, filed Nov. 17, 2023, 33 pages.
Singh et al. "Energy Efficient Ultra-Wideband Latching Tunable Metasurfaces" U.S. Appl. No. 18/616,802, filed Mar. 26, 2024, 34 pages.
N. Rajatheva, I. Atzeni, E. Bjornson et al., "White paper on broadband connectivity in 6G", arXiv preprint arXiv:2004.14247 (Apr. 29, 2020).
Marco Di Renzo, Alessio Zappone, Merouane Debbah et.al., "Smart Radio Environments Empowered by Reconfigurable Intelligent Surfaces: How It Works, State of Research, and The Road Ahead", in IEEE Journal on Selected Areas in Communications, vol. 38, No. 11, pp. 2450-2525, Apr. 20, 2020.
Marios Poulakis, "Metamaterials could solve one of 6G's big problems", in Proceedings of the IEEE, vol. 110, No. 9, pp. 1151-1158, Sep. 3, 2022.
NTT Docomo, "White paper: 5G Evolution and 6G", Jan. 1, 2022.
Jake Jacobsen, "Application in Illumination Design: Analyzing LiDAR Return Signal Strengths for Target Optical Surfaces and Atmospheric Conditions", White Paper, Synopsys, Last Accessed: Mar. 3, 2023.
Singh et al. "Predictive Model for Reconfiguration of Phase Change Material-Based Reconfigurable Intelligent Surface" U.S. Appl. No. 19/023,264, filed Jan. 15, 2025, 42 pages.
Notice of Allowance received for U.S. Appl. No. 18/194,685 dated Aug. 4, 2025, 9 pages.
Non-Final Office Action received for U.S. Appl. No. 18/194,718 dated Oct. 22, 2025, 51 pages.
Non-Final Office Action received for U.S. Appl. No. 18/616,802 dated Apr. 21, 2026, 23 pages.
Notice of Allowance received for U.S. Appl. No. 18/194,718 dated Feb. 27, 2026, 8 pages.
Non-Final Office Action received for U.S. Appl. No. 18/512,304 dated May 14, 2026, 8 pages.
International Preliminary Report on Patentability received for PCT Application Serial No. PCT/US2024/013896 dated May 28, 2026, 11 pages.

* cited by examiner

AUTONOMOUS RECONFIGURABLE INTELLIGENT SURFACES

BACKGROUND

Reconfigurable intelligent surfaces are specifically designed manmade surfaces of electromagnetic material, referred to as metamaterial, that are electronically controlled with integrated electronics. Metamaterials are artificially engineered materials fabricated using a stack of metal and dielectric layers. These thin two-dimensional metasurfaces can tune an electromagnetic wave's key properties, such as amplitude, phase, and polarization, as the electromagnetic wave is reflected or refracted by the surface. In other words, a reconfigurable intelligent surface is a two-dimensional surface whose surface can be electronically altered such that it changes the characteristics of any incoming electromagnetic wave, including the wave's phase.

Each metasurface typically is made up of (possibly up to) hundreds or thousands of unit cells, and because the individual unit cell can be controlled, reconfigurable intelligent surfaces can provide programmable and smart wireless environments. For example, one scenario is to use such a surface to intelligently reconfigure wireless communications. More particularly, objects in the path of a wireless signal, such as buildings and trees, can block wireless communication signals at higher frequencies, such as millimeter-wave frequency bands (24.5 GHz-52.6 GHz), which are expected to move upwards to sub-terahertz bands. This can be overcome by installing a large number of base stations to provide coverage to otherwise blocked areas, but doing so would increase the infrastructure costs many times. Instead, a relatively inexpensive metasurface can be installed at various locations (e.g., one node of several RIS nodes) to reflect and/or refract higher frequency signals to otherwise blocked or weak coverage areas.

When deployed in a dynamic environment, a significant challenge for a reconfigurable intelligent surfaces node to work efficiently is that it needs to have an updated configuration that is suitable for the state of communication channel at that moment. This configuration decides the state of each unit cell, which accordingly redirects the impinging waves. In the relatively few real-life reconfigurable intelligent surfaces prototype tests that have been recently performed, the reconfigurable intelligent surfaces configuration is calculated and sent from the base station every instant, which is an additional and significant burden to the base station. For example, the acquisition of accurate channel state information (CSI) is needed, which usually brings considerable overhead due to the large number of passive elements at a reconfigurable intelligent surface. Moreover, accurate channel estimation is more difficult because of the mobility of some of the objects in a coverage area, hence the Doppler effect needs to be considered.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
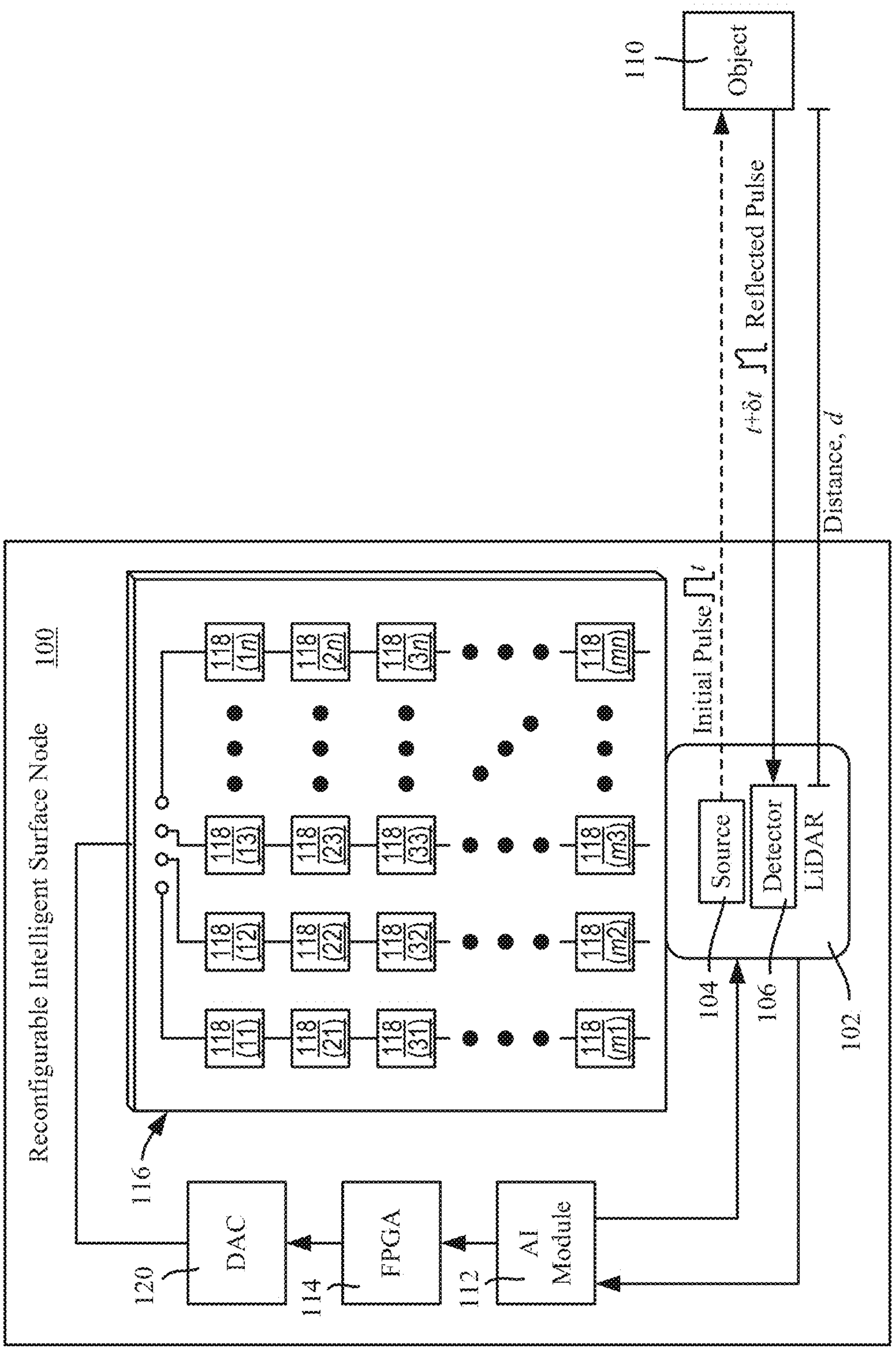
FIG. 1 is an example representation of a reconfigurable intelligent surface node that reconfigures itself based on a sensed environment, in accordance with various aspects and implementations of the subject disclosure.

Various aspects of the technology described herein are generally directed towards an autonomous reconfigurable intelligent surface that is capable of detecting its surroundings and adjusting received electromagnetic beams accordingly. To this end, the reconfigurable intelligent surface node employs a device (e.g., a compact light detection and ranging, or LiDAR device) as part of the node such that the device provides three-dimensional information of the surrounding space, and therefore assists in forming the reconfigurable intelligent surface configuration. The sensed data of the surroundings gives the node the ability to analyze, understand and respond to any changes in the environment (e.g., a coverage area of interest), by adjusting the phase response of unit cells of the reconfigurable intelligent surface as needed to redirect an impinging electromagnetic wave in a desired direction.

As a result, real-time (or near real-time) control of the reconfigurable intelligent surface is achieved from within the node itself. At the same time, the reconfigurable intelligent surface nodes are configured to preserve their low-power nature to the extent possible. The reconfigurable intelligent surface can significantly reduce coverage problems in the millimeter-wave band for 5G, beyond 5G and 6G applications.

It should be understood that any of the examples herein are non-limiting. As one example, a LiDAR device is used by a reconfigurable intelligent surface node for sensing the surrounding environment, however other types of sensors can be used, e.g., distance sensing cameras or the like based on other technologies. As another example, a unit cell of a reconfigurable intelligent surface is described that is based on switching elements made of chalcogenide materials, e.g., alloys based on germanium-antimony-tellurium (GeSbTe); however this is only one non-limiting example, and other materials, including those not yet developed, can be leveraged by the technology described herein. Thus, any of the embodiments, aspects, concepts, structures, functionalities or examples described herein are non-limiting, and the technology may be used in various ways that provide benefits and advantages in communications and computing in general. It also should be noted that terms used herein, such as “optimize” or “optimal” and the like only represent objectives to move towards a more optimal state, rather than necessarily obtaining ideal results.

Reference throughout this specification to “one embodiment,” “an embodiment,” “one implementation,” “an implementation,” etc. means that a particular feature, structure, or characteristic described in connection with the embodiment/implementation can be included in at least one embodiment/implementation. Thus, the appearances of such a phrase “in one embodiment,” “in an implementation,” etc. in various places throughout this specification are not necessarily all referring to the same embodiment/implementation. Furthermore, the particular features, structures, or characteristics may be combined in any suitable manner in one or more embodiments/implementations. Repetitive description of like elements employed in respective embodiments may be omitted for sake of brevity.

The following detailed description is merely illustrative and is not intended to limit embodiments and/or application or uses of embodiments. Furthermore, there is no intention to be bound by any expressed or implied information presented in the preceding sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being “on” or “over” another element, it can be directly on the other element or intervening elements can also be present. In contrast, only if and when an element is referred to as being “directly on” or “directly over” another element, are there are no intervening element(s) present. Note that orientation is generally relative; e.g., “on” or “over” can be flipped, and if so, can be considered unchanged, even if technically appearing to be under or below/beneath when represented in a flipped orientation. It will also be understood that when an element is referred to as being “connected” or “coupled” to another element, it can be directly connected or coupled to the other element or intervening elements can be present. In contrast, only if and when an element is referred to as being “directly connected” or “directly coupled” to another element, are there no intervening element(s) present.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a design of an example autonomous reconfigurable intelligent surface node 100 assisted by a relatively small LiDAR device 102 having a source 104 and detector 106. In general, the LiDAR device 102 sends out laser light from the source (transmitter) 104 and waits for the signal to reflect from the objects (e.g., including the object 110) in a surrounding scene being sensed. The reflected signal is detected by the detector (receiver) 106, and the time lapse between the outgoing light pulse and the reflected light pulse is used to develop a distance map of the objects in the scene. LiDAR systems thus can provide profiles of three-dimensional surfaces in the object space. The probing laser beams are not tied to a specific spectral feature; hence the wavelength of the laser beams may be chosen to ensure eye safety or to avoid atmospheric spectral features. LiDAR can also determine the velocity of a moving target by using a Doppler technique, or by measuring the distance to the target in rapid succession. The scanning speed of a LiDAR device is high, as the device can illuminate a large area at once and safely operate at eye-safe wavelengths. In this way, a three-dimensional model of the world around the LiDAR device is obtained.

More particularly, the LiDAR device 102 sends probing light beams directed at precise angles and quickly scans what is sensed to create a point cloud. Control software and reconstruction software associated with the device 102 converts the point cloud to a three-dimensional model. Note that although there is some additional hardware complexity and power consumption at the reconfigurable intelligent surface node, the additional power used is significantly less than a repeater or a similarly sized active relay.

In addition to the LiDAR, the node 100 includes an artificial intelligence (AI) module 112 (which can include and/or be based on machine learning technology), a controller 114 (in this example a field programmable gate array (FPGA) unit), and a matrix 116 of reconfigurable unit cells

118(11)-118(*mn*) (the squares depicted within the matrix 114) forming the reconfigurable intelligent surface. A digital-to-analog converter or the like 120 can be used to change the phase response or shape of each individual unit cell of the matrix 116 based on a coding sequence or like signals from the controller 114.

After collecting the data from the LiDAR, a low-power (e.g., an ultralow-power chip) AI module 112 in the reconfigurable intelligent surface node 100, as well as efficient machine-learning models provide the intelligence. Such smart models are able to learn the surroundings over time from the received data about the channel from the LiDAR.

Turning to the real-time reconfigurability of the reconfigurable intelligent surface unit cells 118(11)-118(*mn*), the two-dimensional array of unit cells described herein can be controlled by a programmable logic chip, such as a field-programmable gate array (FPGA) with a microcontroller, which can store many coding sequences needed to dynamically tune the reconfigurable intelligent surface in response to changes in the electromagnetic environment. The controller 114 gives the appropriate instructions to the individual unit cells, adjusting their state, such as described herein with reference to the examples in FIGS. 4A and 4B. The AI module 112 and the controller 114 coordinate to generate the configuration for the reconfigurable intelligent surface unit cells 118(11)-118(*mn*), depending on the dynamic environment. This configuration can decide the amplitude and/or phase shift of the redirected (e.g., reflected or refracted) wireless signals from the reconfigurable intelligent surface node. Note that the node also can synchronize the control of a group of unit cells to create constructive or destructive interference in the larger reflected waves.

It should be noted that the controller 114 can be any suitable computing device or multiple, coupled computing devices that can store and/or execute instructions, such as including, but not limited to an FPGA as shown in the example of FIG. 1, a compute unit, an ASIC (application specific integrated circuit), a processor, a microcontroller and so forth. Among the benefits of using an FPGA as the computing device/controller is that in general, an FPGA is a low power-consuming chip with storage, memory, and compute power, typically can be updated, and can be integrated easily with the panels/unit cells and other components shown in the example of FIG. 1.

Figure 2:
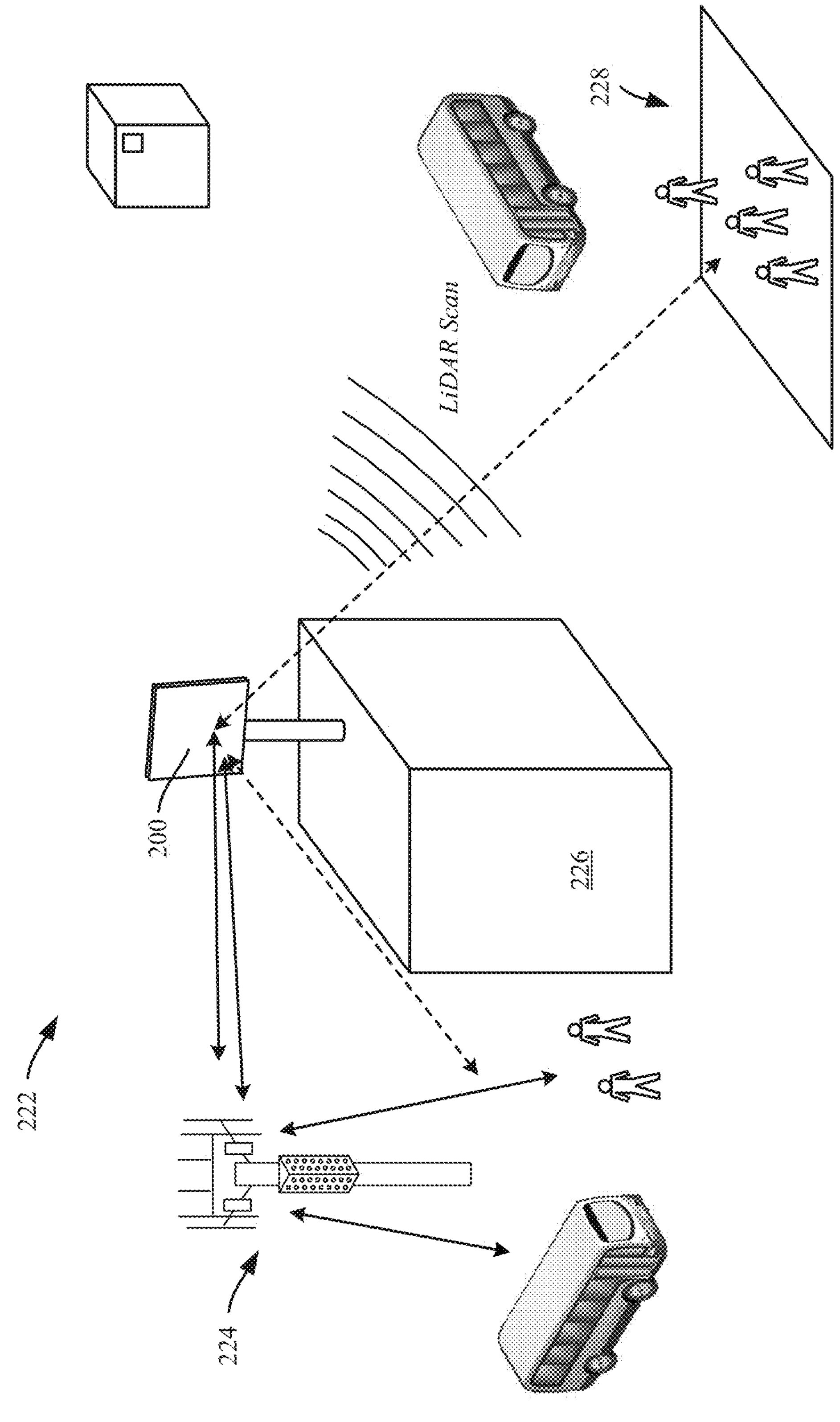
FIGS. 2 and 3 are example representations of an environment that changes over time, and in which a reconfigurable intelligent surface node controls redirection of communication signals based on sensing the environment, in accordance with various aspects and implementations of the subject disclosure.
Figure 3:
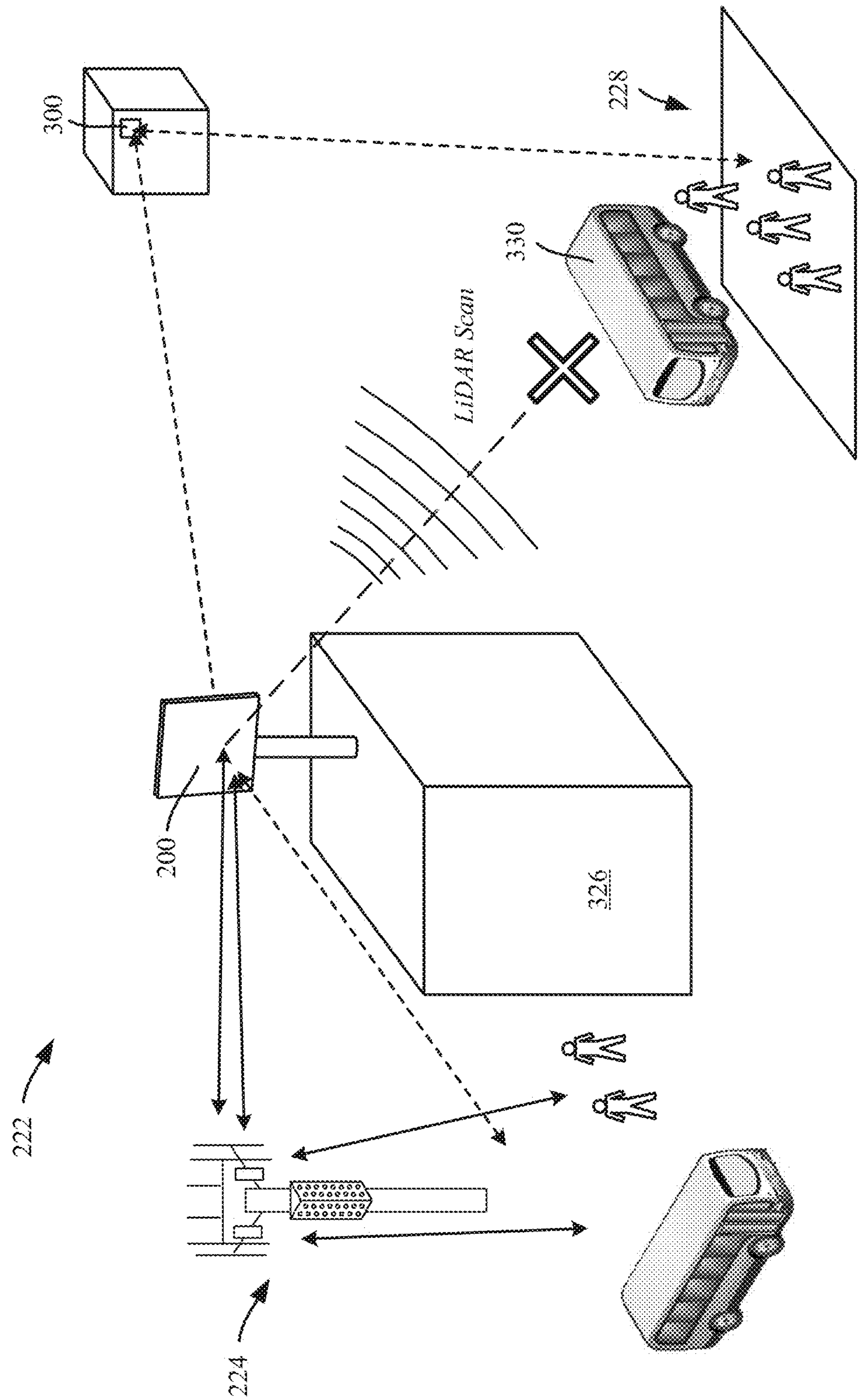

FIGS. 2 and 3 show an example environment 222 in which a base station 224 outputs communication signals at high frequency (e.g., over millimeter-wave or higher frequency bands) to various targets. In this example, a building 226 is an obstacle that blocks the signals at these wavelengths, and thus a reconfigurable intelligent surface node 200 (such as constructed in FIG. 1) is positioned atop the building 226 to redirect the communication signals to otherwise blocked targets, e.g., including the general area 228. The LiDAR scan provides the three-dimensional model directly to the node 200 by which the other components (e.g., the AI module 112 and the controller 114 of FIG. 1) configure the redirection.

At a slightly later time shown in FIG. 3, an obstacle (shown as a bus 330) has moved into the communications path. This situation is detected by the next LiDAR scan, whereby a new communications path is needed, as determined by the AI module 114. Another reconfigurable intelligent surface node 300 is selected as a redirection target to provide a new communications path to the area 228. It should be noted that a target such as a user equipment can also move behind an obstacle from one time to the next, whereby redirection adjustment can be similarly accomplished.

Note that the rate at which LiDAR scans occur can be varied based on any of several factors. For example, the time duration between the collecting of the first three-dimensional data and the collecting of the second three-dimensional data after the collecting of the first three-dimensional data can be determined based on activity data received via the sensor, e.g., motion, number of possible targets and so forth. The activity data can thus include data measured via the sensor, historical data representative of previous activity data (e.g., rush hour versus 2:00 am), statistical data applicable to sensor data acquired via the sensor, movement data determined via the sensor, and/or variable target locations.

Note that the technology described herein is thus in contrast to current systems in which a reconfigurable intelligent surface has purely passive elements, such that the CSI can only be obtained by using a base station or another access point, which are usually far away from the reconfigurable intelligent surface. In such schemes, channel impulse response is measured between the base station, the reconfigurable intelligent surface, and the user equipment (UE). Further, with prior systems, pilot signals or reference signals, which are known beforehand by both transmitter and receiver, need to be sent virtually every instant and from which the required phase shifts for the reconfigurable intelligent surface are calculated. More particularly, in other systems the phase shifts required from each reconfigurable intelligent surface element, and hence its configuration, is calculated at the base station using pilot signals; the total calculated configuration is then sent to the reconfigurable intelligent surface using a wireless control link, which means that each reconfigurable intelligent surface needs to have an active wireless receiver. This wireless receiver hence receives an updated configuration from the base station ideally every instant, which is not only significant overhead for such prior systems, but also consumes significant power. Considering there often are multiple reconfigurable intelligent surfaces deployed in multiple locations, the prior schemes require a complex orchestration of base stations and multiple reconfigurable intelligent surface nodes using wireless control channels. With such current systems, a huge number of training/pilot signals are needed because each reconfigurable intelligent surface element needs its own configuration. Moreover, this prior technique assumes a quasi-static channel that stays approximately constant during CSI estimation, which in reality may not be true due to motions at the communications ends (usually UE) and in the dynamic environment.

The example implementation shown in FIG. 1 makes the reconfigurable intelligent surface node 100 self-reliant rather than waiting for a configuration signal from the base station. The reconfigurable intelligent surface node 100 significantly reduces the overhead on the base station, as the base station is no longer responsible for calculating the configuration for each reconfigurable intelligent surface node 100 after acquiring the CSI, which requires massive signaling. The three-dimensional data model allows the node 100 to determine the configuration on-site via the AI module 112 and controller 114 (FPGA unit).

Figure 4A:
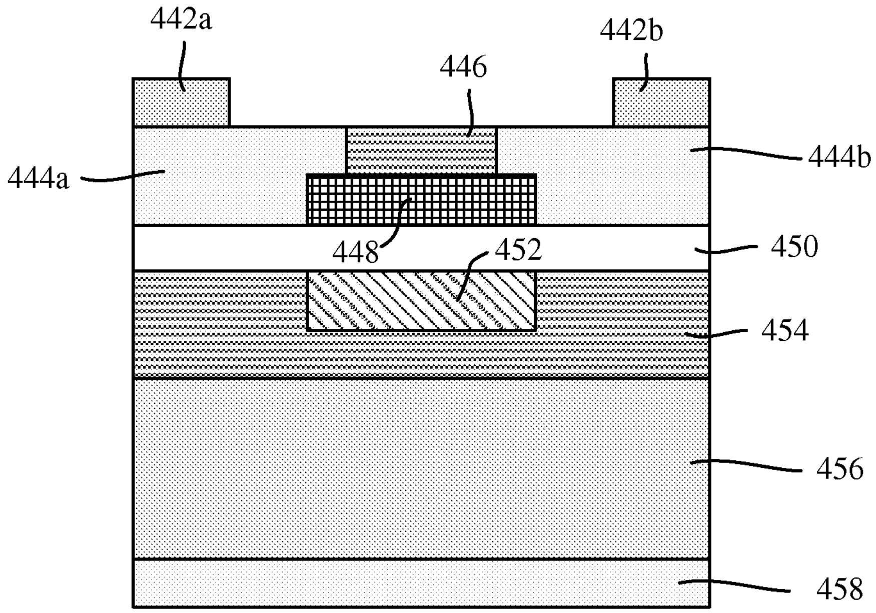
FIG. 4A is a planar implementation example of a chalcogenide-based element in which a phase change material (chalcogenide) can be actuated by a voltage or current pulse to change the resistance of the material, in accordance with various aspects and implementations of the subject disclosure.

Turning to tuning the unit cells' individual phases, in one example implementation the unit cells can be based on chalcogenide elements; a planar implementation approach of the chalcogenide elements for the described technology is shown in FIG. 4A. In FIG. 4, contacts 442*a* and 442*b* are depicted as above metallization components 444*a* and 444*b*, respectively. A thermal barrier 446 is shown above the chalcogenide material 448, which in turn is above a thin insulation layer 450. An actuation mechanism 452 that outputs heat energy based on voltage or current pulses as described herein melt and quench the chalcogenide material 408 through the insulation layer 450, which when applied can change the state of the chalcogenide material 448.

The actuation mechanism 452 is further contained by another thermal barrier 454, which is atop a dielectric substrate 456. A bottom metallization strip 458 is below the dielectric substrate 456.

Phase change (chalcogenide) material is formed with alloys containing group VI elements such as sulfur (S), selenium (Se) and/or telluride (Te). Among these, the germanium-telluride (GeTe) alloy is generally the most popular for radio frequency and optical memory applications. Phase change material has a property of reversibly switching between amorphous and crystalline states upon specific heat treatment by controlled electrical pulses. The state in which atoms are arranged in a disorderly manner (short range order) is called the amorphous state, whereas the state where atoms are organized in an orderly manner (long range order) is called the crystalline state. The disordered amorphous state has a lower mean free path of conduction for electrons that impedes current flow due to electron scattering, thus resulting in a higher resistance state when compared to the crystalline state.

Figure 4B:
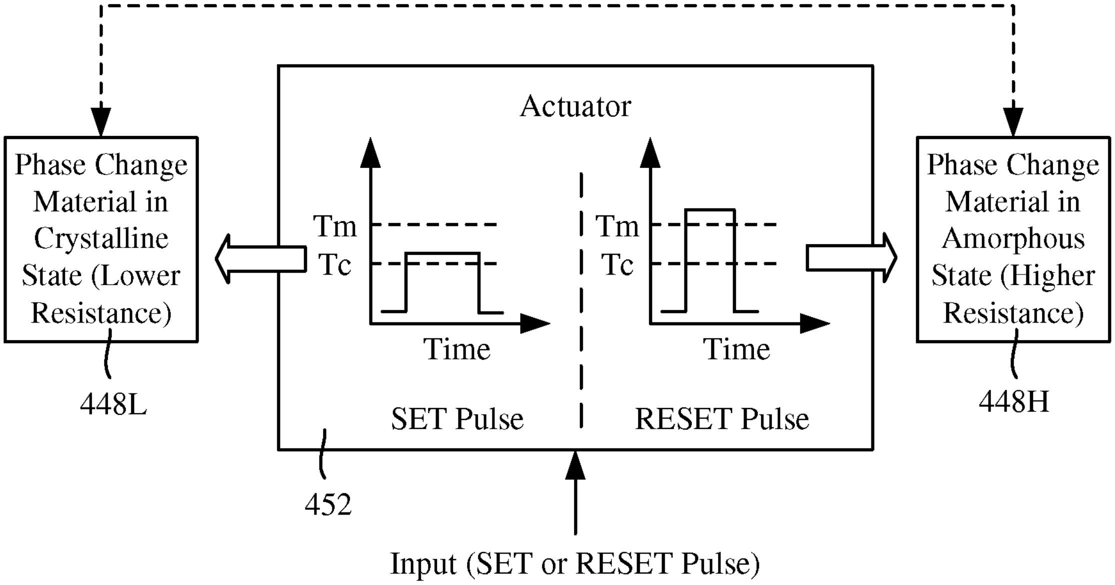
FIG. 4B shows an example of reversible switching of phase change material between an amorphous (high resistance) and crystalline (low resistance) states using a first electrical pulse for one state change and a second electrical pulse for a state change reversal, in accordance with various aspects and implementations of the subject disclosure.

As shown in FIG. 4B, a medium amplitude (typically 4-2 V) and relatively longer duration (typically on the order of 400 nanoseconds) SET electrical pulse (e.g., represented in the left portion of the actuator) is used for crystallization during a transition to the ON state. Energy from the SET pulse heats the material for sufficient time to crystallize the material and provides adequate time for atoms to reorganize to an orderly arrangement, thus transforming from an amorphous state to crystalline state. To change to the amorphous state, a short duration (typically less than 400 nanoseconds) and high amplitude (typically >2 V) RESET electrical pulse is used. The RESET pulse provides sufficient energy to melt the material to disorder the atoms followed by rapid quenching to freeze the atoms, thus transforming the material from the crystalline state to the amorphous state. Significantly, only a short duration pulse is required to switch the state of the material between states; the pulse transforms the material and latches the material into the state, without the need for continuous power in either state. The pulse duration and amplitude can be further optimized by tuning the ratio of GeSbTe alloy ratios.

Figure 5A:
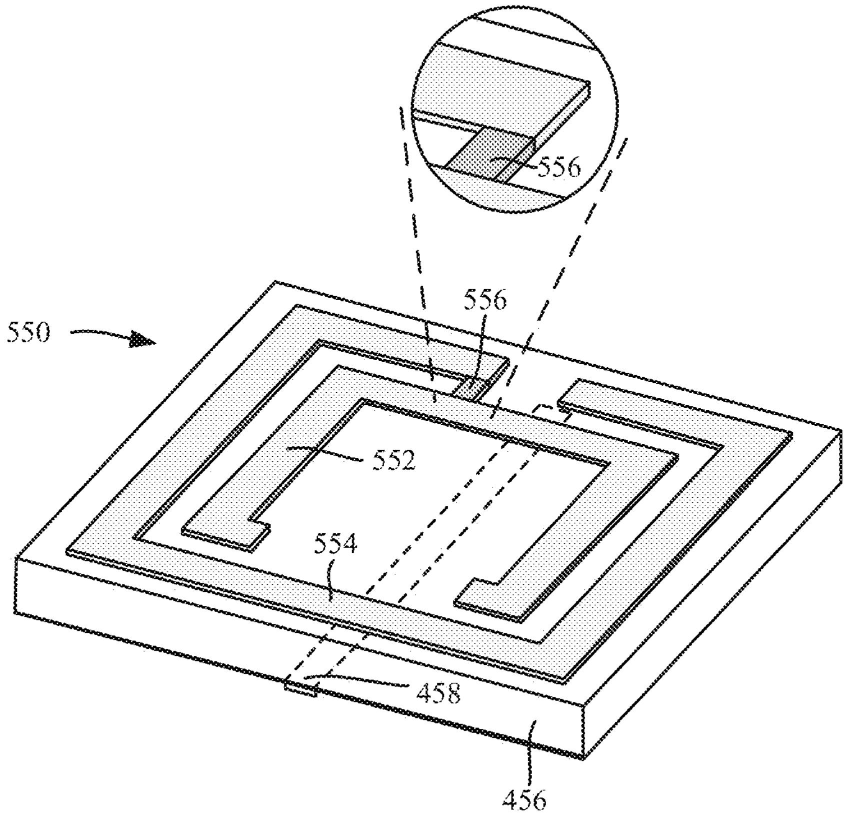
FIG. 5A shows an example of a unit cell suitable for use in a reconfigurable intelligent surface, showing a typical split-ring capacitor design coupled to a multi-state tunable element for reconfigurability, in accordance with various aspects and implementations of the subject disclosure.

FIG. 5A shows an example design of a unit cell 550, including a split-ring type resonator formed by thin film metallization components 552 and 554. The split-ring type structure is formed on the top metal layer which is separated from the bottom metal strip 458 by a high permittivity dielectric substrate 456. The phase reconfigurability is achieved by using a chalcogenide, non-volatile multi-state tunable capacitor 556. Different reflection phases can be obtained by actuating a desired capacitance value or using a combination of capacitance values integrated within the unit cell 520.

Figure 5B:
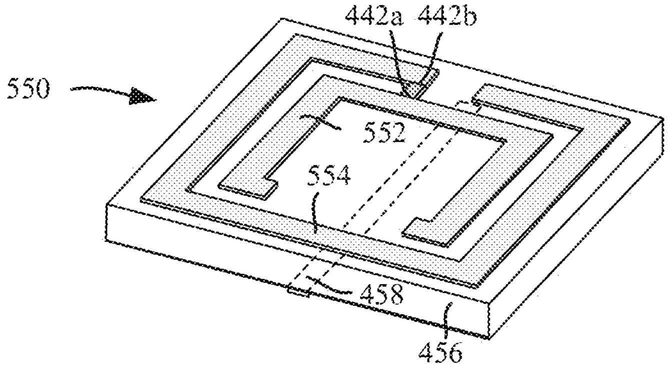
FIG. 5B shows an example of a unit cell that includes a non-volatile multi-state tunable element with two contacts a and b used for integration into the unit cell, in accordance with various aspects and implementations of the subject disclosure.

FIG. 5B shows the unit cell 550 with the contacts 442*a* and 442*b* that couple the chalcogenide, non-volatile multi-state tunable capacitor 556 (FIG. 5A) to the thin film metallization components 552 and 554. The contacts 442*a* and 442*b* thus integrate the non-volatile multi-state tunable element into the unit cell 550 inside the periphery of the split ring (components 552 and 554).

The technology described herein thus provides a unit cell device 550 for very high frequencies that can be used for 5G and 5G-Advanced applications, including millimeter wave capacitance change with zero static DC power consumption. The reconfigurability of the unit cell is achieved by integrating the chalcogenide multi-state tuning capacitor element 556 with the split-ring (components 552 and 554). In one implementation, the size of the tunable element 556 is smaller than 0.2×0.2 mm, thus making this technology a viable choice for highly miniaturized reconfigurable intelligent surface panels. For example, an array of these reconfigurable intelligent surface panels can be used to enhance outdoor wireless communications coverage as well as for indoor radio coverage enhancement. Depending on the choice of substrate 456, such reconfigurable intelligent surface panels can be developed on opaque materials, or transparent materials, e.g., to install on windows.

The multi-state tuning is achieved by integrating metal-insulator-metal capacitors or any other type of capacitors which can be developed using just two metal layers on a substrate, and integrating one or more chalcogenide switches, each having two states, a lower resistance state and a higher resistance state. A single switch is sufficient for two phase changes of a unit cell, e.g., zero or 180 degrees. However, as described herein, a circuit formed by a number of subcircuits can be used to implement analog-like tuning.

One example circuit 660 for the tunable chalcogenide device is shown in FIG. 3, with the contacts 442*a* and 442*b* being accessible for coupling to the split-ring resonator as in FIG. 5B. In one implementation shown in FIG. 6, the switches S1-Sn are in series with the capacitors C1-Cn. Each chalcogenide switch can be independently actuated for a resistance change between the higher and lower resistance states with the application of a short actuation pulse of low voltage and a few nanoseconds time period, as described herein with reference to FIG. 4B.

Figure 6:
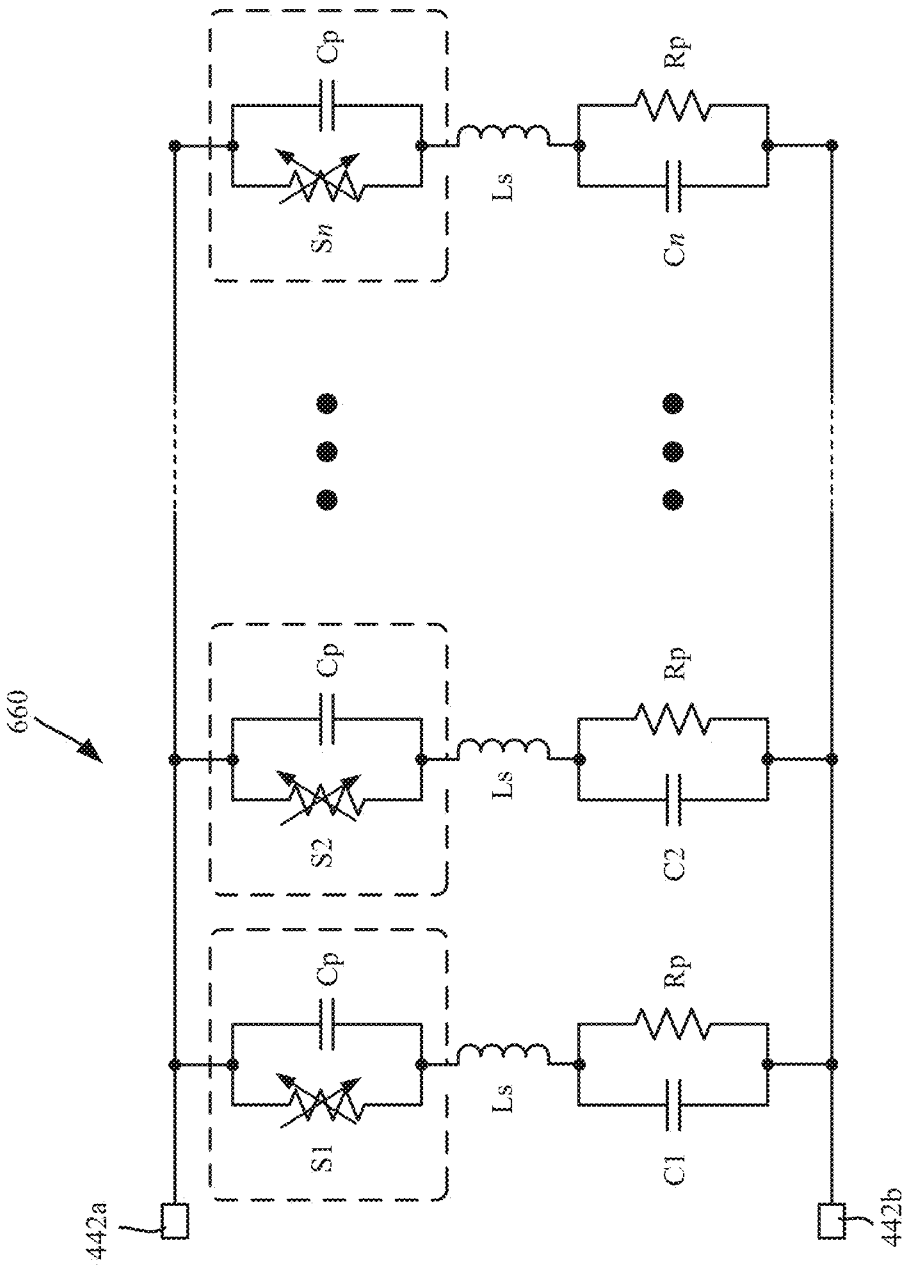
FIG. 6 shows an example circuit model of a tunable chalcogenide device, in which the switching elements' changes between states can provide a range of capacitance values, in accordance with various aspects and implementations of the subject disclosure.

The performance of each switch is dictated by a shunt capacitor Cp as shown in FIG. 6. The value of Cp can be reduced in various known ways. The Ls in each subcircuit is the series inductance between the chalcogenide switch and the capacitor Cn.

Each switching element is changeable between higher and lower resistance states. The capacitor values C1-Cn can be arranged to provide "n"-states with 2n increasing capacitive branches from C1 to Cn.

The capacitance states can be implemented as a 2N succession. For example, if C=0.1 pF, then the first state will be C1 (1×C=0.1 pF), C2 (2×C=0.2 pF), C3 (4×C=0.4 pF), C4 (8×C=0.8 pF), . . . Cn (2n×C=C*2n pF) and so on. The capacitance C can be scaled to a lower value to have more precise control and have more stages, or on the other hand can have larger steps with higher initial C values. To obtain analog-like tuning from this digital step approach, a step value of C=0.1 pF is reasonable to implement on various substrates.

For C=0.1 pF, a chalcogenide switch connected to the respective branch can be actuated to add to the total capacitance of that branch. For example, if in one example design, the device is 4-bit, whereby 16-stage tuning can be achieved by either actuating the switches corresponding to an individual bit or a combination of two or more bits, such as C1 (0.1 pF), C2 (0.2 pF), C1+C2 (0.3 pF), C3 (0.4 pF), C1+C3 (0.5 pF), C2+C3 (0.6 pF), C1+C2+C3 (0.7 pF), C4 (0.8 pF), C1+C4 (0.9 pF), C2+C4 (1.0 pF), C1+C2+C4 (1.1 pF), C3+C4 (1.2 pF), C1+C3+C4 (1.3 pF), C2+C3+C4 (1.4 pF), or C1+C2+C3+C4 (1.5 pF).

From the example of 4-bit tuning, a bit or combination of bits can provide 0.1 pF of step size, which can be reduced by scaling the lowest capacitor, or by increasing from a 4-bit to 5-bit approach. With respect to a single tunable element, the phase precision comes without increasing the complexity of the design. Unlike some PIN diode-based designs, there is no need to add multiple elements to achieve more than two phase states. Further, most commercially available varactors, PIN diodes, or semiconductor switches require constant voltage in the steady state; in contrast, the chalcogenide switches described herein do not require any power to hold either state. When these elements are used in an array of hundreds or thousands of unit cells, the power saving is exponential.

Figure 7:
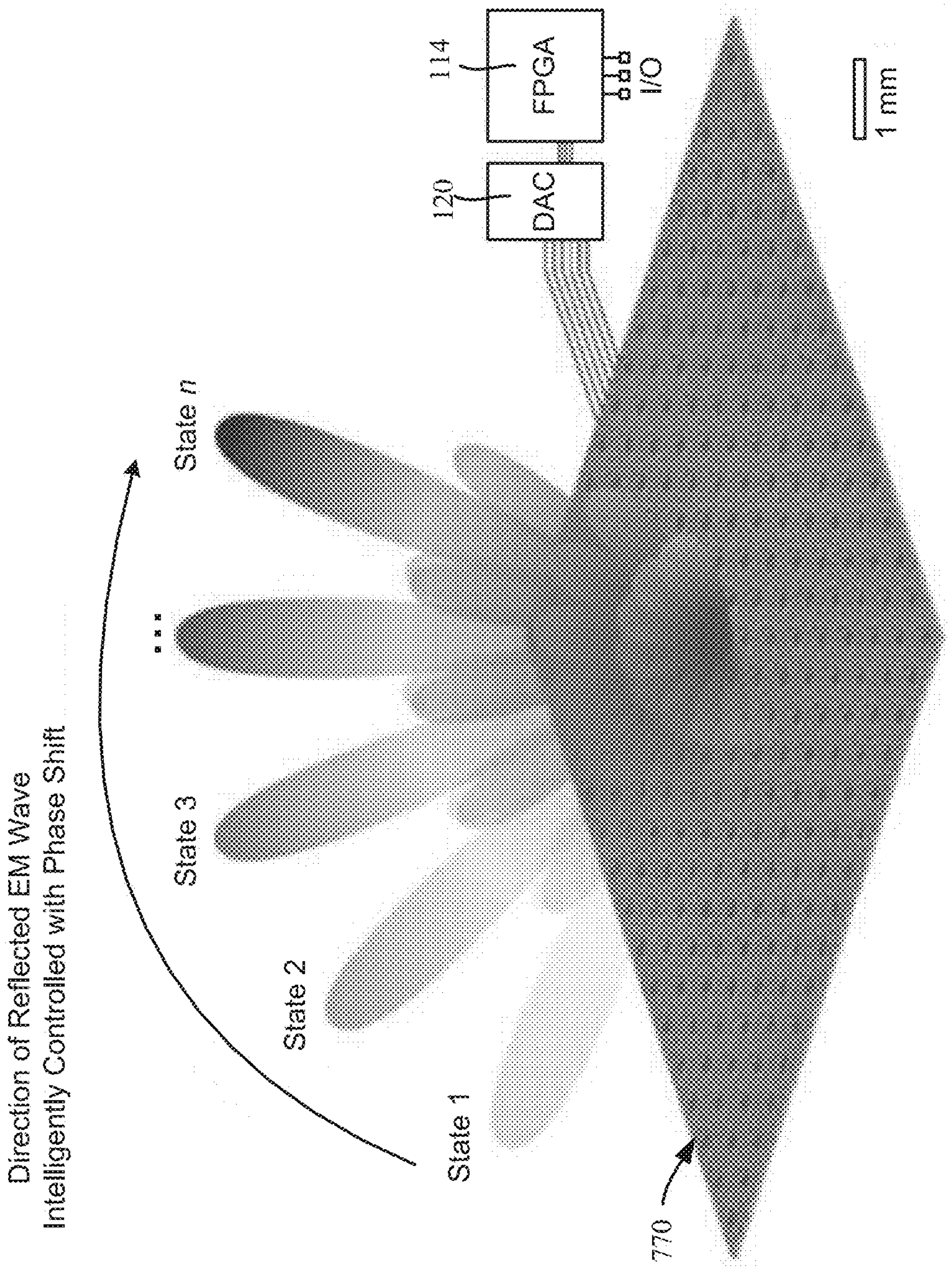
FIG. 7 is a representation of an example overall reconfigurable intelligent surface system showing the direction of the reflected beam being controlled by a configuration provided by a field programmable gate array, in accordance with various aspects and implementations of the subject disclosure.

A reconfigurable intelligent surface can be formed by arranging multiple unit cells in a two-dimensional m×n array, e.g., as shown in the surface 770 of FIG. 7. Each unit cell can alter the phase, hence bend, an impinging electromagnetic wave and redirect the wave in the desired direction. The redirection of larger reflected waves can be controlled by synchronizing the phase shift from a group of unit cells and creating patterns of constructive and destructive interference. This interference pattern reforms the incident beam and sends it in a particular direction determined by the pattern. Such orchestration of phase shift from individual unit cells can be controlled in a reconfigurable intelligent surface configuration via the field-programmable gate array (FPGA) controller 114 or the like. Dynamic reconfiguration is achieved as generally described with reference to FIG. 1.

As shown in FIG. 7, the overall reconfigurable intelligent surface system showing the direction of the reflected beam/electromagnetic wave is intelligently controlled with phase shift by the configuration, in this example via a field-programmable gate array. With respect to configuring the array digitally, a field-programmable gate array (e.g., controller) 114 is used to provide the output, mapped to a cell and converted (DAC 120) to the appropriate RESET or SET pulse based on the zero- or one-bit pattern instruction as needed, to each cell of the array of cells. The output gives instructions to the individual switching elements of the individual unit cells, independent from each other switching element, and sets the cell's capacitance independent from each other cell. Actively tuning the phase change material-based (GeTe) varactors in each cell can be individually controlled by the field-programmable gate array 114, which provides a coding output of 0s and 1s.

Figure 8A:
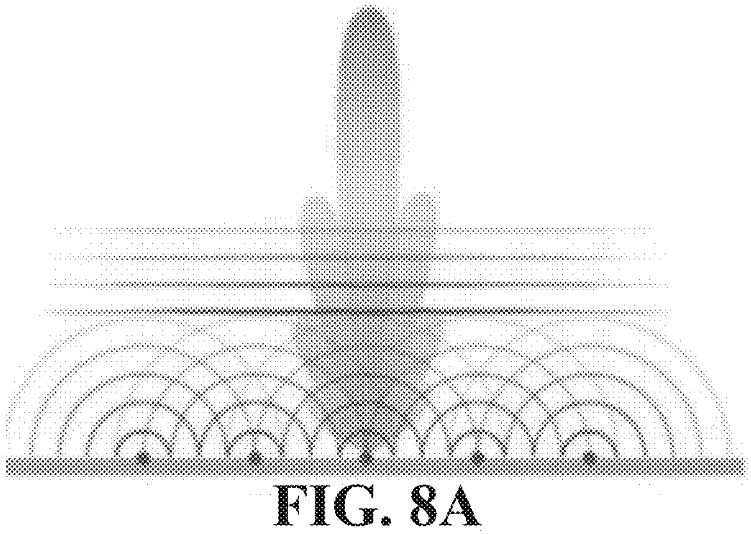
FIGS. 8A-8C are representations of phase shifts from unit cells configured such that a constructive interference of the reflected signals from each unit cell is achieved in a desired target direction, in accordance with various aspects and implementations of the subject disclosure.
Figure 8B:
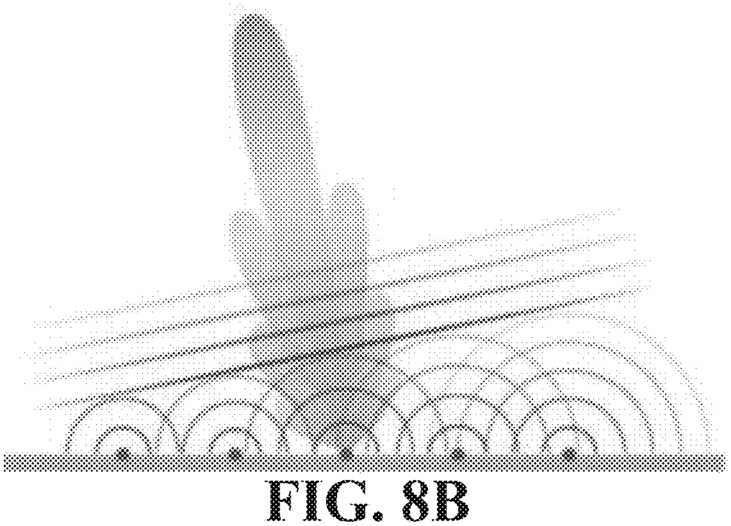
Figure 8C:
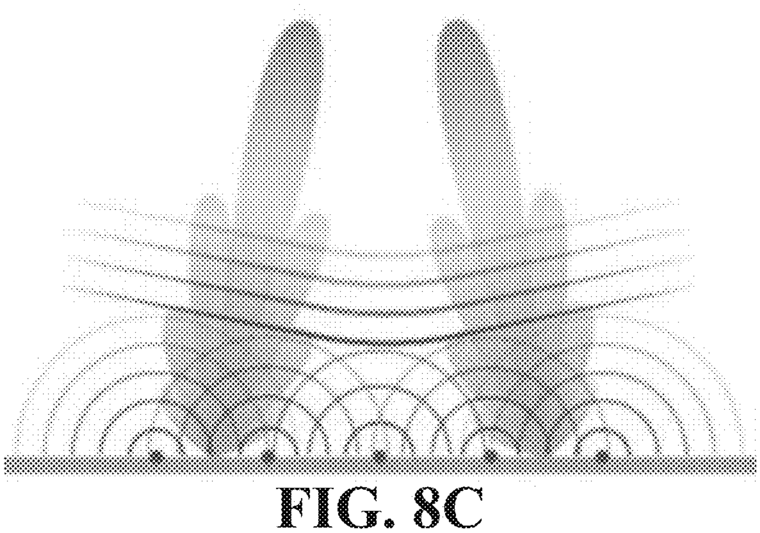

FIGS. 8A-8C show how the phase shifts from the unit cells are configured such that a constructive interference of the reflected signals from each unit cell is achieved in the desired target direction. Destructive interference to a desired direction can also be leveraged.

Unlike other reconfigurable intelligent surfaces (in which each unit cell typically can only provide either a phase response of 0° or 180°; the coding for such a 1-bit digital cell state will be either "0" or "1" for OFF and ON switching, respectively), the analog-like reconfigurable intelligent surface described herein can use higher bit coding to describe the phase responses from individual unit cells. Depending on the beam steering precision desired by a given application, a system can select the number of phase states needed. For example, a 1-bit system can provide 2 possible phase states (chalcogenide switches can be used) while as described above, a 4-bit system can provide 16 different phase state possibilities (e.g., the tunable chalcogenide capacitor as described herein) from each cell.

The technology described herein can function with a minimal power supply, as the electrical pulse is needed only during a change of configuration, a significant advantage over technologies that need continuous power to hold one of the states. As set forth above, the LiDAR and low power AI module do not consume significant additional power. Another significant and beneficial feature of this design is that the unit cells described herein can receive and transmit electromagnetic waves simultaneously, hence achieving full-duplex operation.

Figure 9:
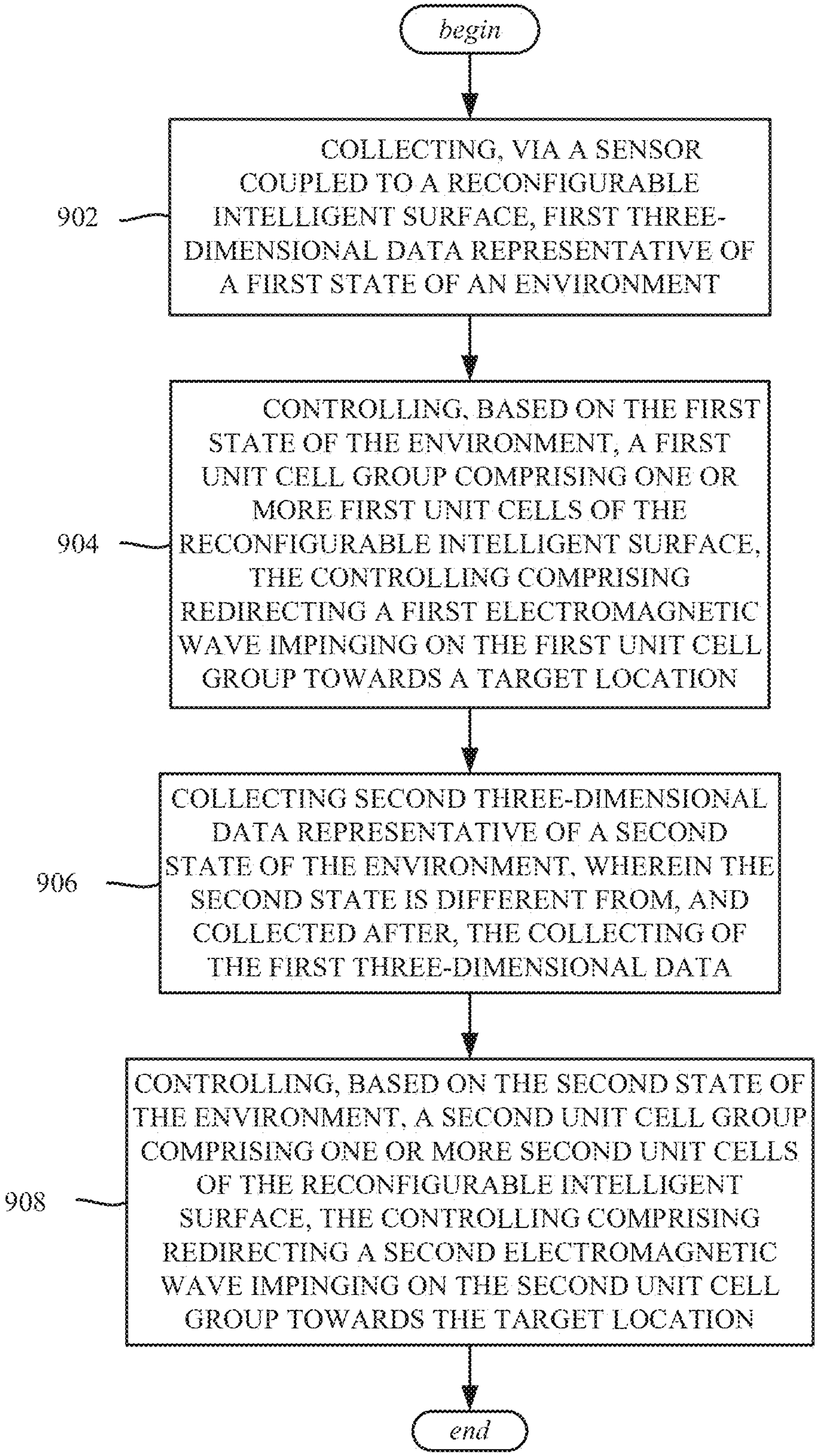
FIG. 9 is a flow diagram showing example operations related to controlling unit cells of a reconfigurable intelligent surface to redirect electromagnetic waves based on sensed environments, in accordance with various aspects and implementations of the subject disclosure.

One or more aspects can be embodied in a system, such as represented in the example operations of FIG. 9, and for example can include a computing device that stores and/or executes executable components and/or operations. Example operations can include operation 902, which represents collecting, via a sensor coupled to a reconfigurable intelligent surface, first three-dimensional data representative of a first state of an environment. Example operation 904 represents controlling, based on the first state of the environment, a first unit cell group comprising one or more first unit cells of the reconfigurable intelligent surface, the controlling comprising redirecting a first electromagnetic wave impinging on the first unit cell group towards a target location. Example operation 906 represents collecting second three-dimensional data representative of a second state of the environment, wherein the second state is different from, and collected after, the collecting of the first three-dimensional data. Example operation 908 represents controlling, based on the second state of the environment, a second unit cell group comprising one or more second unit cells of the reconfigurable intelligent surface, the controlling comprising redirecting a second electromagnetic wave impinging on the second unit cell group towards the target location.

The first electromagnetic wave can be a same frequency as the second electromagnetic wave.

The first unit cell group can be different from the second unit cell group.

The sensor can include a detector of a light detection and ranging (LiDAR) device that outputs signal data for reflection back to the detector.

The first unit cell group can include at least two unit cells, and controlling the first unit cell group can include actuating individual components of the one or more first unit cells of the first unit cell group to create constructive interference in the redirecting of the first electromagnetic wave towards the target location. Actuating the individual components of the one or more first unit cells of the first unit cell group can include outputting a coding sequence from a controller.

Redirecting of the first electromagnetic wave can include changing at least one phase shift of at least one first unit cell of the first unit cell group.

The system can include a third unit cell group of at least two unit cells, the target location can be a first target location, and further operations can include controlling the third unit cell group to create destructive interference in the redirecting of the first electromagnetic wave towards a second target location.

The reconfigurable intelligent surface can be a first reconfigurable intelligent surface, the second three-dimensional data can indicate an obstacle between the first reconfigurable intelligent surface and the target location, and redirecting the second electromagnetic wave towards the target location can include redirecting the second electromagnetic towards a second reconfigurable intelligent surface for further redirection towards the target location.

A time duration between the collecting of the first three-dimensional data and the collecting of the second three-dimensional data after the collecting of the first three-dimensional data can be determined based on activity data received via the sensor.

The activity data can include at least one of measured data measured via the sensor, historical data representative of previous activity data obtained from storage, statistical data applicable to sensor data acquired via the sensor, movement data determined via the sensor, or variable target locations.

Figure 10:
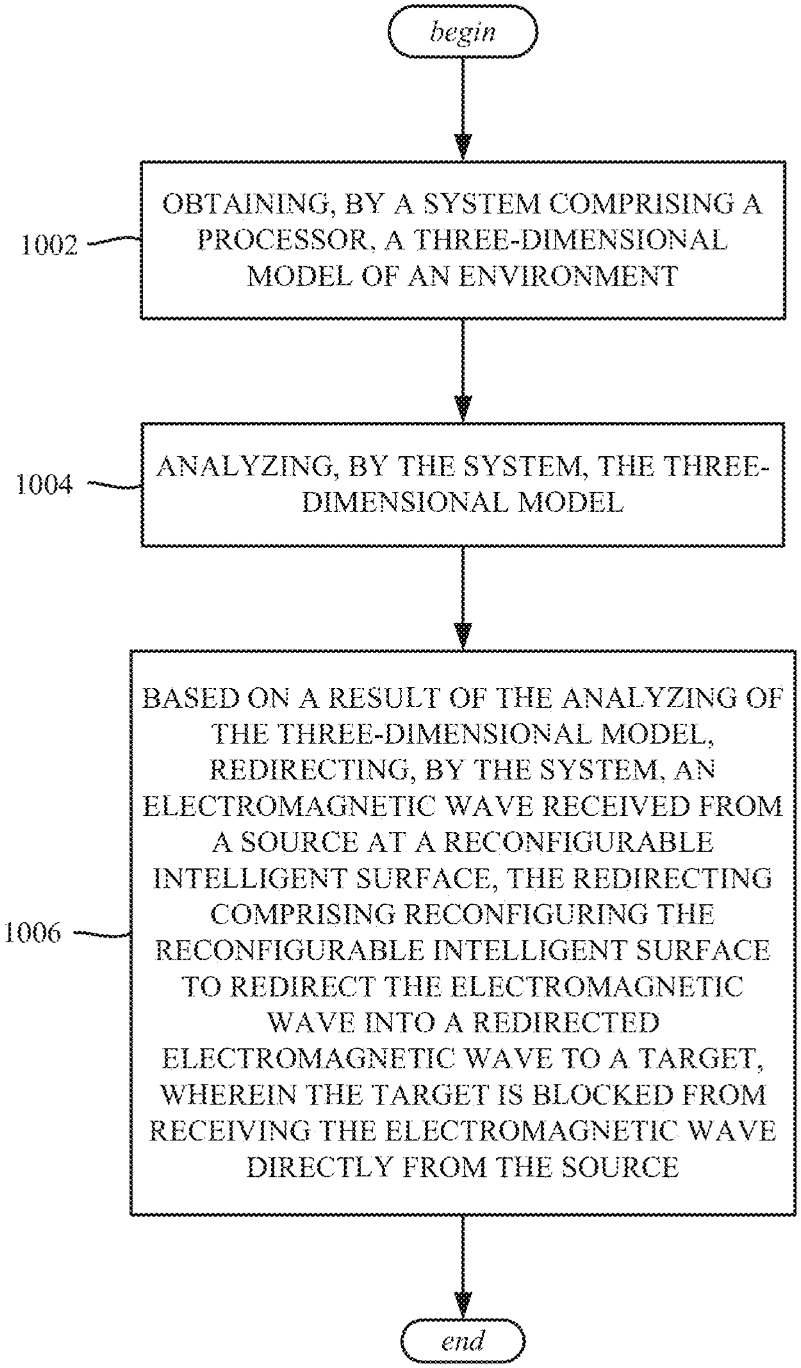
FIG. 10 is a flow diagram showing example operations related to redirecting an electromagnetic wave received at a reconfigurable intelligent surface based on analyzing a three-dimensional model, in accordance with various aspects and implementations of the subject disclosure.

One or more example aspects, such as corresponding to example operations of a method, are represented in FIG. 10. Example operation 1002 represents obtaining, by a system comprising a computing device, a three-dimensional model of an environment. Example operation 1004 represents analyzing, by the system, the three-dimensional model. Example operation 1006 represents, based on a result of the analyzing of the three-dimensional model, redirecting, by the system, an electromagnetic wave received from a source at a reconfigurable intelligent surface, the redirecting including reconfiguring the reconfigurable intelligent surface to redirect the electromagnetic wave into a redirected electromagnetic wave to a target, where the target is blocked from receiving the electromagnetic wave directly from the source.

The three-dimensional model of the environment can be a first three-dimensional model, the redirected electromagnetic wave is a first redirected electromagnetic wave, wherein the result can be a first result, and further operations can include obtaining, by the system, a second three-dimensional model of the environment that is obtained after the obtaining of the first three-dimensional model, analyzing, by the system, the second three-dimensional model, based on a second result of the analyzing of the second three-dimensional model, determining, by the system, that an obstacle is diminishing the first redirected electromagnetic wave with respect to being received at the target, and in response to the determining that the obstacle is diminishing the first redirecting, reconfiguring, by the system, the reconfigurable intelligent surface to redirect the electromagnetic wave into a second redirected electromagnetic wave to the target.

The reconfigurable intelligent surface can be a first reconfigurable intelligent surface, and reconfiguring the reconfigurable intelligent surface to redirect the electromagnetic wave into the second redirected electromagnetic wave to the target can include redirecting the second redirected electromagnetic wave to a second reconfigurable intelligent surface.

Determining that the obstacle is between the source of the electromagnetic wave and the target can be based on the target having been determined to have moved from a first location represented in the first three-dimensional model to a second location represented in the second three-dimensional model.

Determining that the obstacle is between the source of the electromagnetic wave and the target can be based on the obstacle having been determined to have moved from a first location represented in the first three-dimensional model to a second location represented in the second three-dimensional model.

Figure 11:
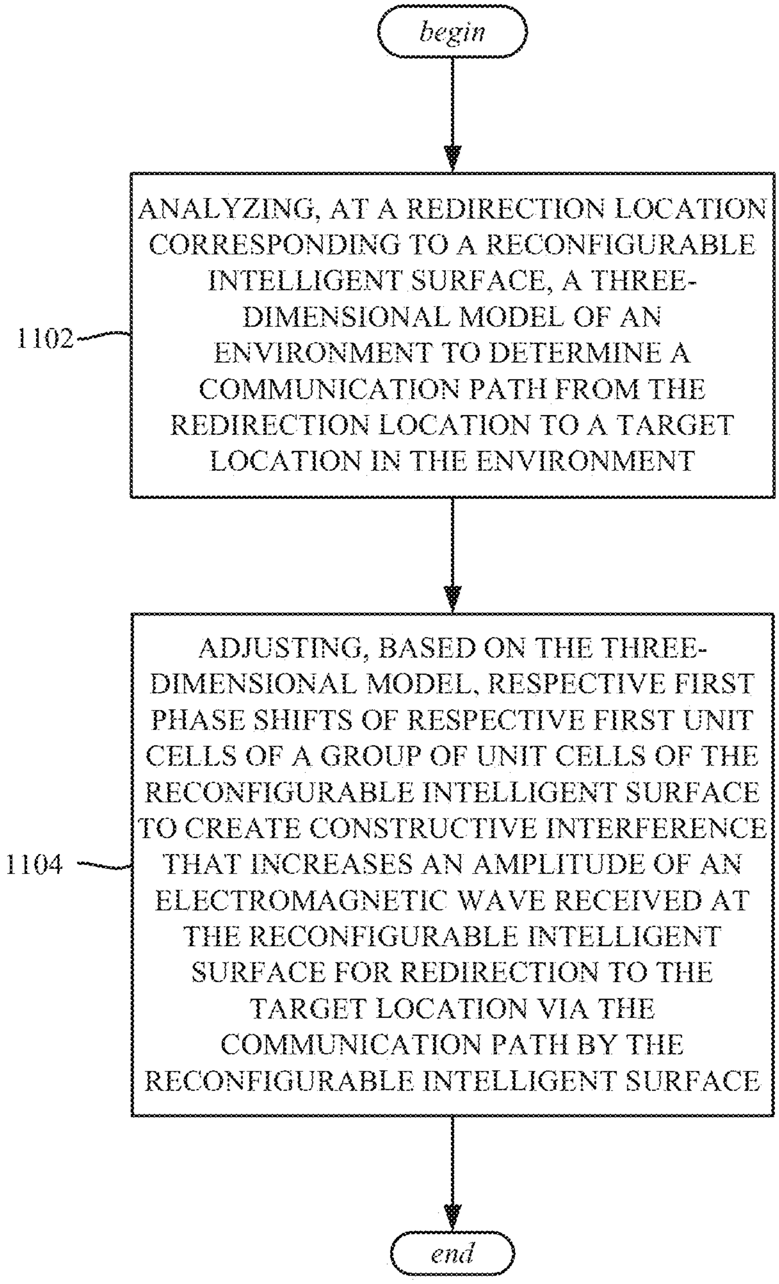
FIG. 11 is a flow diagram showing example operations related to adjusting, based on a three-dimensional model, phase shifts of a group of unit cells of a reconfigurable intelligent surface to create constructive interference with respect to a received electromagnetic wave, in accordance with various aspects and implementations of the subject disclosure.

FIG. 11 summarizes various example operations, e.g., corresponding to a machine-readable medium, comprising executable instructions that, when executed by a computing device, facilitate performance of operations. Example operation 1102 represents analyzing, at a redirection location corresponding to a reconfigurable intelligent surface, a three-dimensional model of an environment to determine a communication path from the redirection location to a target location in the environment. Example operation 1104 represents adjusting, based on the three-dimensional model, respective first phase shifts of respective first unit cells of a group of unit cells of the reconfigurable intelligent surface to create constructive interference that increases an amplitude of an electromagnetic wave received at the reconfigurable intelligent surface for redirection to the target location via the communication path by the reconfigurable intelligent surface.

The target location can be a first target location, the communication path can be a first communication path, the group of unit cells can be a first group of unit cells, analyzing the three-dimensional model of the environment can determine a second communication path from the redirection location to a second target location in the environment, and further operations can include adjusting respective second phase shifts of respective second unit cells of a second group of unit cells of the reconfigurable intelligent surface to create destructive interference that cancels receiving of the electromagnetic wave at the second target location.

The three-dimensional model can be a first three-dimensional model, the communication path can be a first communication path, and further operations can include analyzing, at the redirection location, a second three-dimensional model of the environment to determine a second communication path from the redirection location to the target location, and adjusting, based on the analyzing of the second three-dimensional model, the respective first phase shifts of the respective first unit cells of the group of unit cells of the reconfigurable intelligent surface to redirect the electromagnetic wave received at the reconfigurable intelligent surface to the target location via the second communication path.

The reconfigurable intelligent surface can be a first reconfigurable intelligent surface, and adjusting of the respective first phase shifts of the respective first unit cells of the group of unit cells of the reconfigurable intelligent surface can redirect the electromagnetic wave received at the first reconfigurable intelligent surface to the target location via a second reconfigurable intelligent surface in the second communication path.

As can be seen, the technology described herein facilitates dynamic reconfiguration of the unit cells of a reconfigurable intelligent surface node that changes its unit cells (e.g., their phases) to redirect waves based on a current environment. Significant reduction in power and signaling overhead are achieved.

What is described herein include mere examples. It is, of course, not possible to describe every conceivable combination of components, materials or the like for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a computing device that stores and executes instructions that facilitate performance of operations, the operations comprising:

collecting, via a sensor coupled to a reconfigurable intelligent surface, first three-dimensional data representative of a first state of an environment;

controlling, based on the first state of the environment, a first unit cell group comprising one or more first unit cells of the reconfigurable intelligent surface, the controlling comprising redirecting a first electromagnetic wave impinging on the first unit cell group towards a target location;

collecting second three-dimensional data representative of a second state of the environment, wherein the second state is different from, and collected after, the collecting of the first three-dimensional data; and controlling, based on the second state of the environment, a second unit cell group comprising one or more second unit cells of the reconfigurable intelligent surface, the controlling comprising redirecting a second electromagnetic wave impinging on the second unit cell group towards the target location, wherein the first unit cell group comprises a first chalcogenide-based non-volatile multi-state tunable element, wherein controlling the first unit cell group comprises actuating the first chalcogenide-based non-volatile multi-state tunable element with a voltage or current pulse to change a resistance state of the first chalcogenide-based non-volatile multi-state tunable element, wherein the second unit cell group comprises a second chalcogenide-based non-volatile multi-state tunable element, and wherein controlling the second unit cell group comprises actuating the second chalcogenide-based non-volatile multi-state tunable element with a voltage or current pulse to change a resistance state of the second chalcogenide-based non-volatile multi-state tunable element.

2. The system of claim 1, wherein the first electromagnetic wave is a same frequency as the second electromagnetic wave.

3. The system of claim 1, wherein the first unit cell group is different from the second unit cell group.

4. The system of claim 1, wherein the sensor comprises a detector of a light detection and ranging (LiDAR) device that outputs signal data for reflection back to the detector.

5. The system of claim 1, wherein the first unit cell group comprises at least two unit cells, and wherein the controlling of the first unit cell group comprises actuating individual components of the one or more first unit cells of the first unit cell group to create constructive interference in the redirecting of the first electromagnetic wave towards the target location.

6. The system of claim 5, wherein the actuating of the individual components of the one or more first unit cells of the first unit cell group comprises outputting a coding sequence from a controller.

7. The system of claim 1, wherein the redirecting of the first electromagnetic wave comprises changing at least one phase shift of at least one first unit cell of the first unit cell group.

8. The system of claim 1, further comprising a third unit cell group of at least two unit cells, wherein the target location is a first target location, and wherein the operations further comprise controlling the third unit cell group to create destructive interference in the redirecting of the first electromagnetic wave towards a second target location.

9. The system of claim 1, wherein the reconfigurable intelligent surface is a first reconfigurable intelligent surface, wherein the second three-dimensional data indicates an obstacle between the first reconfigurable intelligent surface and the target location, and wherein the redirecting of the second electromagnetic wave towards the target location comprises redirecting the second electromagnetic wave towards a second reconfigurable intelligent surface for further redirection towards the target location.

10. The system of claim 1, wherein a time duration between the collecting of the first three-dimensional data and the collecting of the second three-dimensional data after the collecting of the first three-dimensional data is determined based on activity data received via the sensor.

11. The system of claim 10, wherein the activity data comprises at least one of measured data measured via the sensor, historical data representative of previous activity data obtained from storage, statistical data applicable to sensor data acquired via the sensor, movement data determined via the sensor, or variable target locations.

12. A method, comprising:

obtaining, by a system comprising a computing device, a three-dimensional model of an environment;

analyzing, by the system, the three-dimensional model; and based on a result of the analyzing of the three-dimensional model, redirecting, by the system, an electromagnetic wave received from a source at a reconfigurable intelligent surface, the redirecting comprising reconfiguring the reconfigurable intelligent surface to redirect the electromagnetic wave into a redirected electromagnetic wave to a target, wherein the target is blocked from receiving the electromagnetic wave directly from the source, wherein the reconfigurable intelligent surface comprises a chalcogenide-based non-volatile multi-state tunable element, and wherein the reconfiguring of the reconfigurable intelligent surface comprises actuating the chalcogenide-based non-volatile multi-state tunable element with a voltage or current pulse to change a resistance state of the chalcogenide-based non-volatile multi-state tunable element.

13. The method of claim 12, wherein the three-dimensional model of the environment is a first three-dimensional model, wherein the redirected electromagnetic wave is a first redirected electromagnetic wave, wherein the result is a first result, and further comprising:

obtaining, by the system, a second three-dimensional model of the environment that is obtained after the obtaining of the first three-dimensional model;

analyzing, by the system, the second three-dimensional model;

based on a second result of the analyzing of the second three-dimensional model, determining, by the system, that an obstacle is diminishing the first redirected electromagnetic wave with respect to being received at the target; and in response to the determining that the obstacle is diminishing the first redirecting, reconfiguring, by the system, the reconfigurable intelligent surface to redirect the electromagnetic wave into a second redirected electromagnetic wave to the target.

14. The method of claim 13, wherein the reconfigurable intelligent surface is a first reconfigurable intelligent surface, and wherein the reconfiguring of the reconfigurable intelligent surface to redirect the electromagnetic wave into the second redirected electromagnetic wave to the target comprises redirecting the second redirected electromagnetic wave to a second reconfigurable intelligent surface.

15. The method of claim 13, wherein the determining that the obstacle is between the source of the electromagnetic wave and the target is based on the target having been determined to have moved from a first location represented in the first three-dimensional model to a second location represented in the second three-dimensional model.

16. The method of claim 13, wherein the determining that the obstacle is between the source of the electromagnetic wave and the target is based on the obstacle having been determined to have moved from a first location represented in the first three-dimensional model to a second location represented in the second three-dimensional model.

17. A non-transitory machine-readable medium, comprising executable instructions that, when executed by a computing device, facilitate performance of operations, the operations comprising:

analyzing, at a redirection location corresponding to a reconfigurable intelligent surface, a three-dimensional model of an environment to determine a communication path from the redirection location to a target location in the environment; and adjusting, based on the three-dimensional model, respective first phase shifts of respective first unit cells of a group of unit cells of the reconfigurable intelligent surface to create constructive interference that increases an amplitude of an electromagnetic wave received at the reconfigurable intelligent surface for redirection to the target location via the communication path by the reconfigurable intelligent surface, wherein the group of unit cells comprises a chalcogenide-based non-volatile multi-state tunable element, and wherein the respective first phase shifts are implemented by actuating the chalcogenide-based non-volatile multi-state tunable element with a voltage or current pulse configured to change a resistance state of the chalcogenide-based non-volatile multi-state tunable element.

18. The non-transitory machine-readable medium of claim 17, wherein the target location is a first target location, wherein the communication path is a first communication path, wherein the group of unit cells is a first group of unit cells, and wherein the analyzing of the three-dimensional model of the environment determines a second communication path from the redirection location to a second target location in the environment, and wherein the operations further comprise adjusting respective second phase shifts of respective second unit cells of a second group of unit cells of the reconfigurable intelligent surface to create destructive interference that cancels receiving of the electromagnetic wave at the second target location.

19. The non-transitory machine-readable medium of claim 17, wherein the three-dimensional model is a first three-dimensional model, wherein the communication path is a first communication path, and wherein the operations further comprise analyzing, at the redirection location, a second three-dimensional model of the environment to determine a second communication path from the redirection location to the target location, and adjusting, based on the analyzing of the second three-dimensional model, the respective first phase shifts of the respective first unit cells of the group of unit cells of the reconfigurable intelligent surface to redirect the electromagnetic wave received at the reconfigurable intelligent surface to the target location via the second communication path.

20. The non-transitory machine-readable medium of claim 19, wherein the reconfigurable intelligent surface is a first reconfigurable intelligent surface, and wherein the adjusting of the respective first phase shifts of the respective first unit cells of the group of unit cells of the reconfigurable intelligent surface redirects the electromagnetic wave received at the first reconfigurable intelligent surface to the target location via a second reconfigurable intelligent surface in the second communication path.

* * * * *